US012005017B2

(12) United States Patent
Lee et al.

(10) Patent No.: US 12,005,017 B2
(45) Date of Patent: Jun. 11, 2024

(54) THERMO-THERAPEUTIC APPARATUS

(71) Applicant: CERAGEM CO., LTD., Cheonan-si (KR)

(72) Inventors: Dong Myoung Lee, Asan-si (KR); Sang Ho Choi, Cheonan-si (KR); Yong Seob Seo, Cheonan-si (KR); Yong Son Park, Asan-si (KR)

(73) Assignee: CERAGEM CO., LTD., Chungcheongnam-Do (KR)

( * ) Notice: Subject to any disclaimer, the term of this patent is extended or adjusted under 35 U.S.C. 154(b) by 110 days.

(21) Appl. No.: 16/280,114

(22) Filed: Feb. 20, 2019

(65) Prior Publication Data

US 2019/0262207 A1 Aug. 29, 2019

(30) Foreign Application Priority Data

Feb. 27, 2018 (KR) ........................ 10-2018-0023967

(51) Int. Cl.
*A61H 1/00* (2006.01)
*A61H 23/02* (2006.01)
(Continued)

(52) U.S. Cl.
CPC ........... *A61H 1/00* (2013.01); *A61H 23/0263* (2013.01); *A61H 39/04* (2013.01);
(Continued)

(58) Field of Classification Search
CPC ...... A61H 1/00; A61H 7/007; A61H 23/0263; A61H 23/02; A61H 23/00; A61H 39/04;
(Continued)

(56) References Cited

U.S. PATENT DOCUMENTS 4,210,134 A * 7/1980 Okazaki ................. A61H 39/04
5/421
5,336,159 A * 8/1994 Cheng ................ A61H 23/0263
601/15

(Continued)

FOREIGN PATENT DOCUMENTS

CN 2684862 3/2005
CN 2724665 9/2005

(Continued)

OTHER PUBLICATIONS

International Search Report and Written Opinion issued in Corresponding PCT Application No. PCT/KR2019/000992, dated May 8, 2019 (English Translation provided).

(Continued)

*Primary Examiner* — Tu A Vo
*Assistant Examiner* — Kelsey E Baller
(74) *Attorney, Agent, or Firm* — NORTON ROSE FULBRIGHT US LLP

(57) ABSTRACT

A thermo-therapeutic apparatus is provided. The thermo-therapeutic apparatus according to one embodiment includes a first supporting plate having a plurality of through holes formed therein and formed of skin foam; a front cover disposed on the first supporting plate so that one side of the first supporting plate is exposed, and to which the first supporting plate is coupled; a plurality of ceramics each insertion-fixed to the plurality of through holes, and each configured to protrude to the outside of the first supporting plate to a predetermined height; a heater disposed on one sides of the plurality of ceramics and configured to heat the plurality of ceramics; a second supporting plate disposed on one side of the heater and including a vibrator; and a rear cover disposed on one side of the second supporting plate and coupled to the front cover.

19 Claims, 5 Drawing Sheets

(51) Int. Cl.
*A61H 39/04* (2006.01)
*A61H 39/00* (2006.01)

(52) U.S. Cl.
CPC .................. *A61H 2039/005* (2013.01); *A61H 2201/0207* (2013.01); *A61H 2201/0228* (2013.01); *A61H 2201/165* (2013.01); *A61H 2205/083* (2013.01)

(58) Field of Classification Search
CPC .......... A61H 39/007; A61H 2201/0207; A61H 2201/165; A61H 2201/0228; A61H 2201/1207; A61H 2201/10; A61H 2007/0228
See application file for complete search history.

(56) References Cited

U.S. PATENT DOCUMENTS

| | | | | | |
|---|---|---|---|---|---|
| 6,511,446 | B1 * | 1/2003 | Wu | A61F 7/02 | 601/15 |
| 7,722,553 | B2 * | 5/2010 | Lev | A61H 15/0078 | 601/15 |
| 2002/0068886 | A1 * | 6/2002 | Lin | A61H 9/0078 | 601/15 |
| 2003/0163176 | A1 * | 8/2003 | Bae | A61F 7/007 | 607/96 |
| 2005/0021114 | A1 * | 1/2005 | Hidaka | A61H 39/06 | 607/114 |
| 2005/0043655 | A1 * | 2/2005 | Schenck | A61N 1/321 | 601/15 |
| 2005/0059909 | A1 * | 3/2005 | Burgess | A61F 7/007 | 601/15 |
| 2006/0129072 | A1 * | 6/2006 | Shin | A61H 7/004 | 601/18 |
| 2007/0167885 | A1 * | 7/2007 | Moon | A61H 11/00 | 601/71 |
| 2008/0119764 | A1 * | 5/2008 | Song | A61H 23/0254 | 601/46 |
| 2013/0303952 | A1 * | 11/2013 | Golan | A43B 7/146 | 601/46 |
| 2015/0045702 | A1 * | 2/2015 | Lin | A61F 7/007 | 601/19 |
| 2017/0189226 | A1 * | 7/2017 | Kim | A61N 7/00 | |
| 2018/0153735 | A1 * | 6/2018 | Shim | A61F 7/007 | |
| 2021/0015701 | A1 * | 1/2021 | Nuffer | A61H 23/02 | |

FOREIGN PATENT DOCUMENTS

| | | |
|---|---|---|
| CN | 102048636 | 5/2011 |
| CN | 107411945 | 12/2017 |
| JP | 3091042 | 1/2003 |
| JP | 2003204982 | 7/2003 |
| JP | 2004073643 | 3/2004 |
| JP | 2005296378 | 10/2005 |
| JP | 2008178523 | 8/2008 |
| JP | 3169233 | 7/2011 |
| KR | 200318298 | 6/2003 |
| KR | 200353602 | 6/2004 |
| KR | 200353619 | 6/2004 |
| KR | 200353662 | 6/2004 |
| KR | 10-2005-0094935 | 9/2005 |
| KR | 20080023714 | 3/2008 |
| KR | 100920239 | 10/2009 |
| KR | 101766338 | 8/2017 |
| RU | 2009147840 | 6/2011 |

OTHER PUBLICATIONS

Office Action issued in Corresponding Chinese Application No. 201910086531, dated Dec. 16, 2020 (English Translation provided).

Office Action issued in Corresponding Russian Application No. 2020128283, dated Jan. 15, 2021 (No English Translation provided).

Office Action issued in corresponding Japanese Application No. 2020-544928, dated Jul. 13, 2021 (Japanese. English Machine Translation).

Extended European Search Report issued in Corresponding European Application No. 19760472.1, dated Nov. 3, 2021.

* cited by examiner

THERMO-THERAPEUTIC APPARATUS

CROSS-REFERENCE TO RELATED APPLICATION

This application claims priority to and the benefit of Korean Patent Application No. 2018-0023967, filed on Feb. 27, 2018, the disclosure of which is incorporated herein by reference in its entirety.

BACKGROUND

1. Field of the Invention

The present disclosure relates to a thermo-therapeutic apparatus, and more particularly, to a thermo-therapeutic apparatus having a massage function provided through vibration and a thermal function for thermotherapy.

2. Discussion of Related Art

Massage is one kind of physiotherapy provided to apply physical stimulation to skin or a part of a body to treat diseases by revitalizing soft tissue of the body part or improve health. Particularly, massage of an abdomen of the body helps greatly to activate bowel functions.

In the case of the abdomen massage, since a massage function for relaxing muscles alone is not effective for activating bowel functions, a thermal function for applying heat is additionally required.

However, when the thermal function is applied to ceramics, since manufacturing processes such as coupling of the ceramics and the like are complicated, a great deal of time and expense are required. Particularly, when vibration is added for massage, since ceramics may be separated apart from a main body or noises may occur due to the vibration, a user may feel inconvenienced.

SUMMARY OF THE INVENTION

The present disclosure is directed to a thermo-therapeutic apparatus configured to prevent separation of ceramics in use and reduce noises generated by vibration while also improving manufacturing efficiency due to an insertion structure.

According to an aspect of the present disclosure, there is provided a thermo-therapeutic apparatus including a first supporting plate having a plurality of through holes formed therein and formed of skin foam; a front cover disposed on the first supporting plate so that one side of the first supporting plate is exposed, and to which the first supporting plate is coupled; a plurality of ceramics each insertion-fixed to the plurality of through holes, and each configured to protrude to the outside of the first supporting plate to a predetermined height; a heater disposed on one sides of the plurality of ceramics and configured to heat the plurality of ceramics; a second supporting plate disposed on one side of the heater and including a vibrator; and a rear cover disposed on one side of the second supporting plate and coupled to the front cover.

The heater may be disposed to be in contact with lower surfaces of the plurality of ceramics, may be formed in a plate shape or a linear shape, and may include one among a hot wire, an aluminum heater, a non-woven carbon fabric, a cotton mesh heater, and a carbon fiber heater.

The thermo-therapeutic apparatus may further comprise a heater supporting member configured to support the heater.

Each of the plurality of ceramics may include a downwardly open hollow.

The ceramics may include a protruding portion formed to extend toward a side surface along an outer circumferential side, the first supporting plate may include a groove portion provided so that the protruding portion is inserted into the through hole, and the ceramics may be insertion-fixed to the through hole through a forcible insertion method.

The through hole may be disposed at a location corresponding to an acupuncture point of an abdomen.

Each of the front cover and the rear cover may include holes in both sides thereof to be held by a user.

The thermo-therapeutic apparatus may further include a wearing belt to be worn on a waist of the user, wherein the front cover and the rear cover may include fixing grooves so that the wearing belt may be detachably inserted into both sides thereof.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
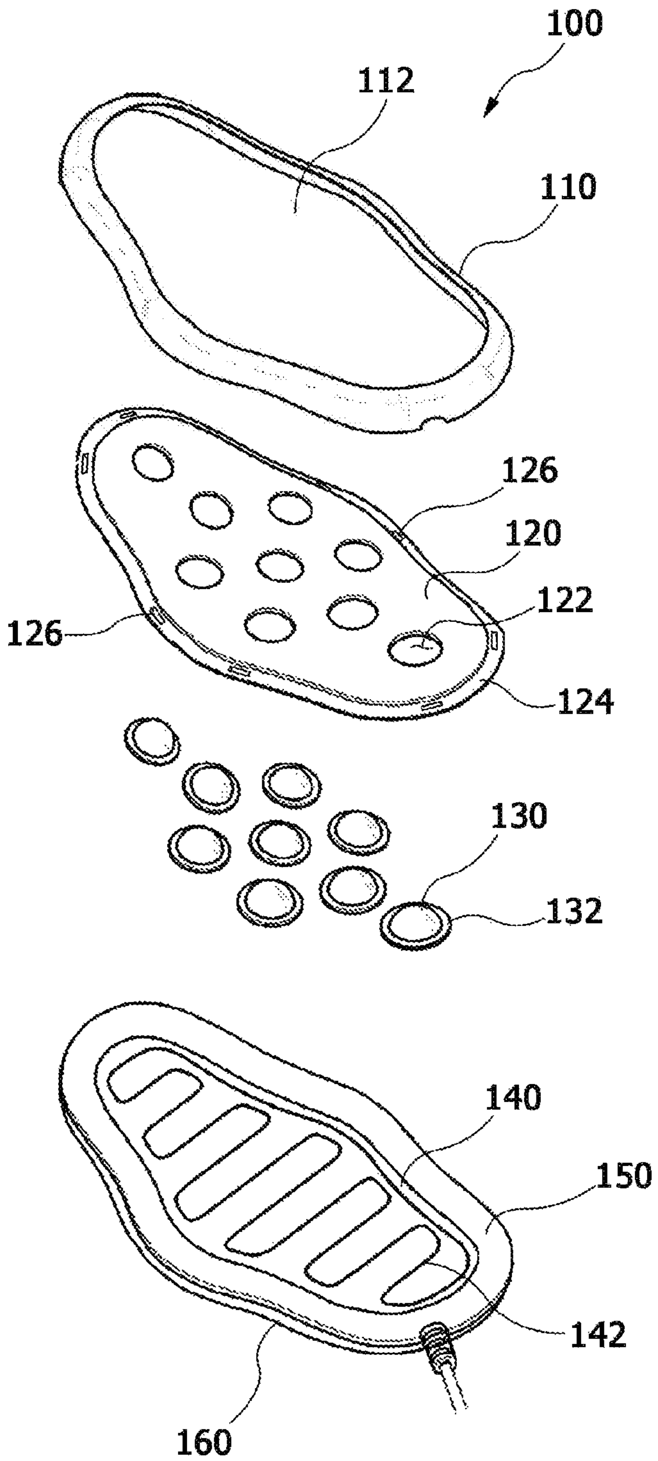
FIG. 1 is an exploded perspective view illustrating a thermo-therapeutic apparatus according to one embodiment of the present disclosure.

Hereinafter, exemplary embodiments of the present disclosure will be described in detail with reference to the accompanying drawings which allows one of ordinary skill in the art to easily perform the present disclosure. The present disclosure may be implemented in various forms and is not limited to the below-described embodiments. Components not related to the description are omitted in the drawings to clearly describe the present disclosure, and the same reference symbols are used for the same or similar components in the description.

Hereinafter, a thermo-therapeutic apparatus 100 according to one embodiment of the present disclosure will be described in more detail with reference to the drawings.

Figure 2:
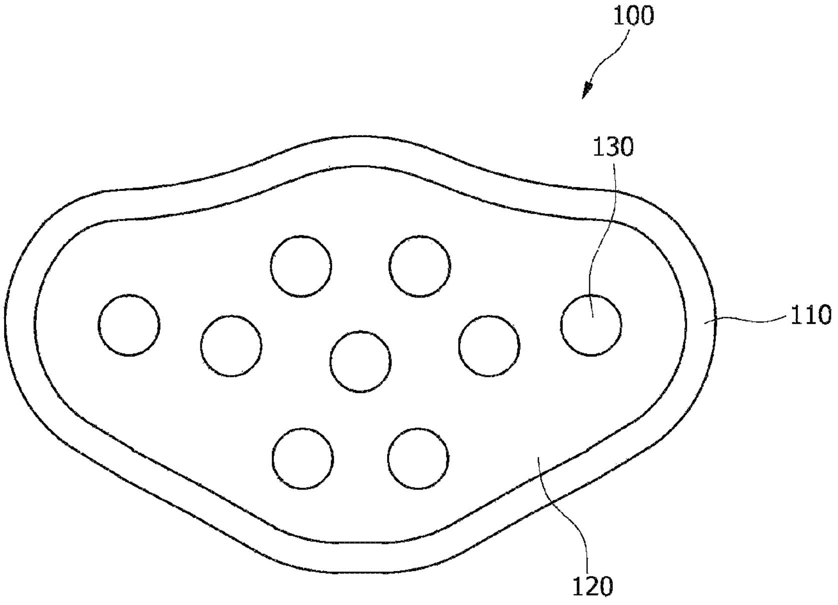
FIG. 2 is a plan view schematically illustrating the thermo-therapeutic apparatus according to the embodiment of the present disclosure.

Referring to FIGS. 1 and 2, the thermo-therapeutic apparatus 100 according to one embodiment of the present disclosure includes a front cover 110, a first supporting plate 120, ceramics 130, a heater 142, a second supporting plate 150, and a rear cover 160.

The front cover 110 may include an exposed part 112 disposed at a center thereof so that the first supporting plate 120 is outwardly exposed. Here, the front cover 110 may be disposed at one side of the first supporting plate 120. As an example, with respect to FIG. 1, the front cover 110 may be disposed on the first supporting plate 120.

Figure 3:
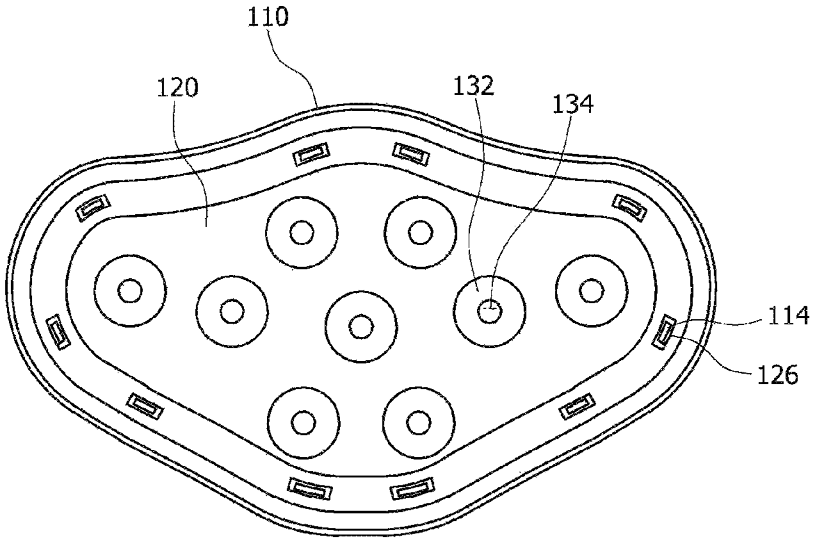
FIG. 3 is a plan view illustrating a state in which a front cover, a first supporting plate, and ceramics in FIG. 1 are coupled.

Further, as shown in FIG. 3, the front cover 110 may include hook protrusions 114 in a plurality of locations along an outer circumferential side of a rear surface. Accordingly, the front cover 110 may be insertion-coupled to the first supporting plate 120.

However, a coupling structure between the front cover 110 and the first supporting plate 120 is not limited thereto and may have various types. As an example, the front cover 110 and the first supporting plate 120 may be coupled by bolt coupling, fusion, bonding, or press.

The first supporting plate 120 may be formed of skin foam. Here, skin foam may have elasticity. Accordingly, the first supporting plate 120 may be formed of a material having elasticity not limited to skin foam.

Accordingly, the thermo-therapeutic apparatus 100 may reduce noises caused by friction between the front cover 110, the ceramics 130, and the second supporting plate 150 even when vibration is generated by a vibrator 170 which will be described below.

Further, since the first supporting plate 120 is a part configured to directly come into contact with an abdomen of a user, the first supporting plate 120 feels soft because it is made of skin foam. In addition, since the outwardly exposed first supporting plate 120 is formed of skin foam, the first supporting plate 120 has a high quality appearance which looks like leather, and thus satisfaction of the user may be improved.

In addition, a plurality of through holes 122 may be formed in the first supporting plate 120. Here, the plurality of through holes 122 may be disposed at locations corresponding to an acupuncture point of an abdomen. In this case, the through holes 122 may be uniformly or nonuniformly disposed to be distributed throughout the entire first supporting plate 120.

Figure 4:
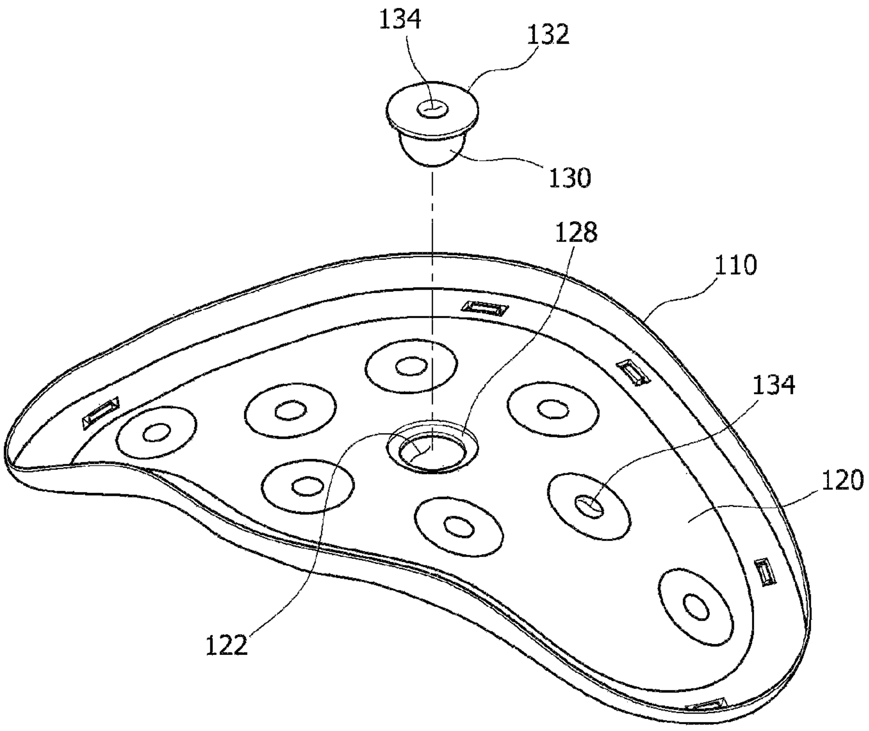
FIG. 4 is a perspective view illustrating a state before the ceramics in FIG. 3 are inserted.
Figure 5:
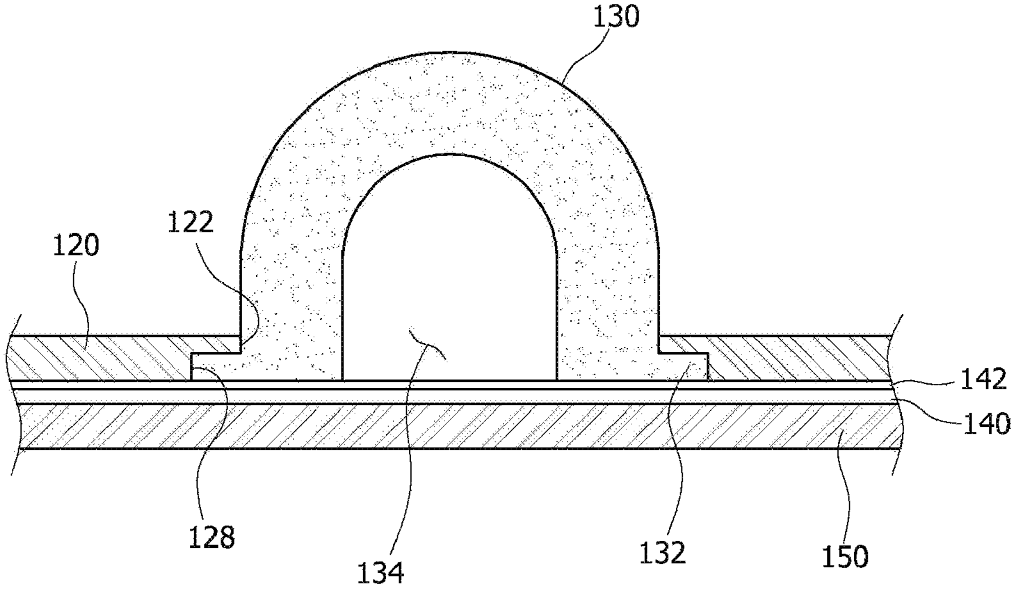
FIG. 5 is a cross-sectional view illustrating a state of contact between a heater and the ceramics.

As shown in FIGS. 4 and 5, each of the through holes 122 may include a groove portion 128 therein into which a protruding portion 132 of each of the ceramics 130 is inserted. Each of the through holes 122 may be provided to have a diameter the same as that of a lower end portion of each of the ceramics 130. Accordingly, the ceramics 130 may be coupled to the through holes 122 through a forcible insertion method.

Further, the first supporting plate 120 may include a step portion 124 along an outer circumferential side thereof. A part of the front cover 110 on which the hook protrusions 114 are provided may be seated into the step portion 124. Here, the step portion 124 may be provided to have a smaller thickness than that of a center of the first supporting plate 120.

In addition, as shown in FIGS. 1 and 3, the first supporting plate 120 may include hook grooves 126, which correspond to the hook protrusions 114 of the front cover 110, along the outer circumferential side of the first supporting plate 120. The step portion 124 may include the hook grooves 126.

The ceramics 130 may be formed of a material capable of providing various functions such as far infrared radiation, immunity improvement, electromagnetic wave block, and the like. Further, the ceramics 130 may be formed of a material having high conductivity to efficiently transfer heat of the heater 142 to the human body.

Here, each of the ceramics 130 has no particular limitation in shape, but the end portion may form a globular shape so that the ceramics 130 which come into contact with the human body may uniformly apply vibration to the human body when the vibration generated by the vibrator 170 is applied.

In this case, each of the ceramics 130 may be formed at a predetermined height to protrude to the outside of the first supporting plate 120. Here, the predetermined height may be a height suitable to apply acupressure to the abdomen of the user. That is, each of the ceramics 130 may have a cylindrical shape having the predetermined height and an upper end portion which may be convexly formed.

Accordingly, when ceramics 130 come into contact with the human body, the vibration generated by the vibrator 170 may be more efficiently transferred to the human body.

Further, the plurality of ceramics 130 may each be insertion-fixed to the plurality of through holes 122 of the first supporting plate 120.

As shown in FIGS. 1 and 5, each of the ceramics 130 may include the protruding portion 132 formed to laterally extend along an outer circumferential side of each of the ceramics 130. The protruding portion 132 may be seated into the groove portion 128 of the first supporting plate 120. Here, a part above the protruding portion 132 of each of the ceramics 130 may have a diameter substantially the same as that of each of the through holes 122. Accordingly, the ceramics 130 may each be insertion-fixed into the through holes 122 through a forcible insertion method.

Further, since the protruding portion 132 of each of the ceramics 130 is fixed by the groove portion 128 of the first supporting plate 120, the ceramics 130 may not be separated out of the first supporting plate 120 even when the thermo-therapeutic apparatus 100 is vibrated.

In this case, as shown in FIGS. 3 and 5, a lower surface of each of the ceramics 130 may include a downwardly open hollow 134. That is, each of the ceramics 130 may be formed in a dome shape having a predetermined thickness and a hollow center.

Accordingly, when heat is transferred from a heater, since each of the ceramics 130 transfers the heat along a surface thereof more quickly than a ceramic in which a hollow is filled, thermal efficiency of the ceramics 130 may be improved. Further, since the ceramics 130 may prevent a loss of a material corresponding to the hollow, manufacturing costs may be reduced.

As described above, since the front cover 110, the first supporting plate 120, and the ceramics 130 are each coupled through an insertion method, a manufacturing process is simplified and time for curing an adhesive is not necessary unlike a conventional thermo-therapeutic apparatus, and thus manufacturing time may be reduced. Accordingly, manufacturing efficiency of the thermo-therapeutic apparatus 100 according to the embodiment of the present disclosure may be improved.

With respect to FIG. 1, the heater 142 may be disposed under the plurality of ceramics 130. The heater 142 is configured to heat the plurality of ceramics 130. Here, the heater 142 is disposed on a heater supporting member 140 or on the second supporting plate 150. The heater supporting member 140 is configured to support the heater 142, and is not particularly limited to a material thereof.

As described in FIGS. 1 and 5, the heater 142 may be disposed to be in contact with a lower surface of each of the plurality of ceramics 130. That is, the heater 142 may be disposed to be in direct contact with a lower surface of the protruding portion 132 of each of the ceramics 130.

Here, the heater 142 may be formed in an integrally formed linear shape. As an example, the heater 142 may be disposed in a zigzag shape to pass under the lower surface of each of the ceramics 130 as a hot wire. That is, as shown in FIG. 1, the heater 142 may be disposed in a zigzag shape following along a side surface of the heater supporting member 140 while moving from one side of the heater supporting member 140 to another side of the heater supporting member 140.

However, the heater 142 is not limited to the linear shape and may be formed in a plate shape. In this case, the heater 142 may include an aluminum heater, a non-woven carbon fabric, a cotton mesh heater, and a carbon fiber heater.

Accordingly, the heat generated from the heater 142 may be efficiently transferred to the ceramics 130. Accordingly, the thermal efficiency of the ceramics for a thermal function in the thermo-therapeutic apparatus 100 may be improved.

Further, by providing both acupressure due to vibration of the ceramics 130 and heat generated by the heat of the heater 142, the thermo-therapeutic apparatus 100 may efficiently improve activation of intestinal movement.

With respect to FIG. 1, the second supporting plate 150 may be disposed under the heater supporting member 140. Here, the heater supporting member 140 is disposed on an upper surface of the second supporting plate 150, and the vibrator 170 and a circuit 180 may be provided on a lower surface of the second supporting plate 150.

Figure 6:
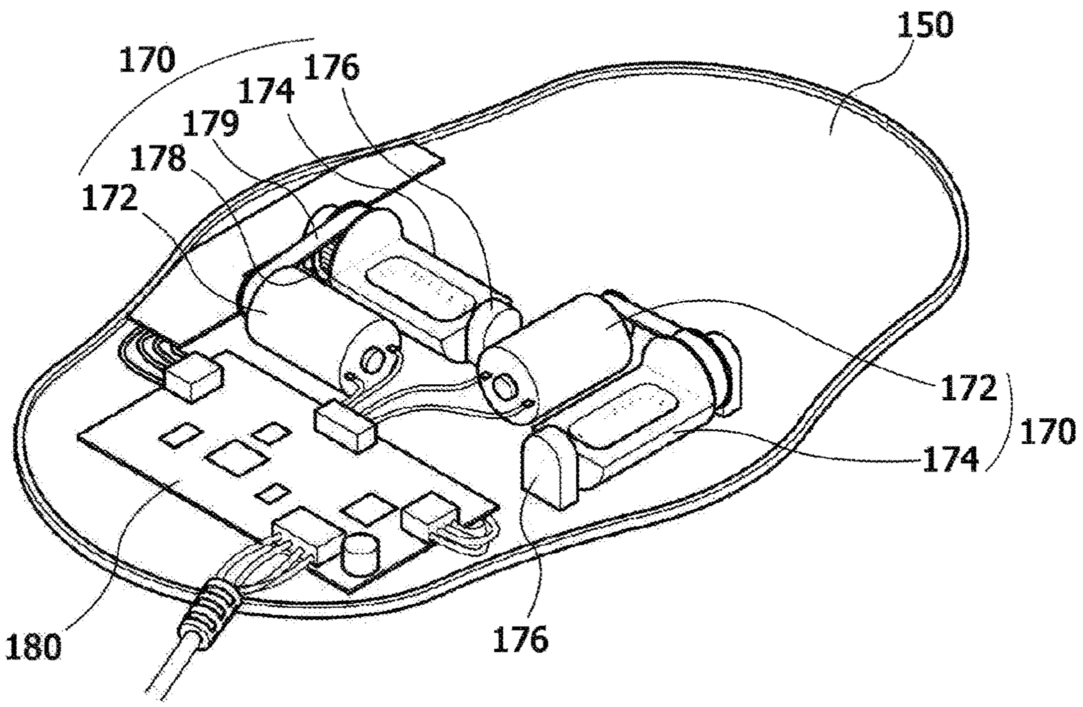
FIG. 6 is a perspective view illustrating a state in which vibrators are provided in the first supporting plate.

As shown in FIG. 6, the vibrator 170 may be disposed on a lower surface of the second supporting plate 150. That is, the vibrator 170 may be disposed between the second supporting plate 150 and the rear cover 160.

The vibrator 170 includes a motor 172 and a vibration part 174. Here, the motor 172 and the vibration part 174 may be connected by a pulley 178 and a belt 179. Accordingly, since the vibration part 174 is eccentrically rotated by rotation of the motor 172, the thermo-therapeutic apparatus 100 may generate vibration.

The vibration part 174 may be an eccentric vibration part in a semicylindric shape having an eccentric rotary shaft. Here, the rotary shaft of the vibration part 174 may be supported by supports 176 provided at both sides of the vibration part 174.

Further, two vibrators 170 may be disposed to be operated perpendicularly to each other. As an example, in FIG. 6, the vibrator 170 disposed at a left side may be disposed to vibrate in a longitudinal direction of the second supporting plate 150, and the vibrator 170 disposed at a right side may be disposed to vibrate in a width direction of the second supporting plate 150.

In this case, by controlling an order of the longitudinal direction and the width direction of the second supporting plate 150, various directions of vibration motion may be implemented.

The circuit 180 may include a power supply configured to supply power to the motor 172, and a controller configured to control an operation of the thermo-therapeutic apparatus 100. Although not shown in the drawings, an operation part which may be operated by the user to operate the thermo-therapeutic apparatus 100 may be provided in the circuit 180 or provided in the rear cover to be connected to the circuit 180. Here, the operation part may include a selection part for power on or off, temperature setting, mode setting, and intensity setting.

Further, the circuit 180 may include a communication part configured to communicate with an external appliance such as a remote controller. In this case, the external appliance may include a selection function of the operation part.

With respect to FIG. 1, the rear cover 160 may be disposed under the second supporting plate 150. The rear cover 160 may have a shape in which a space, in which the vibrator 170 is provided, is formed between the second supporting plate 150 and the rear cover 160. Here, the rear cover 160 may be coupled to the front cover 110 by an insertion method.

Meanwhile, since the thermo-therapeutic apparatus 100 is operated in a state of being disposed on the abdomen of the user for a certain time, the thermo-therapeutic apparatus 100 may be provided to be holdable by the user.

Figure 7:
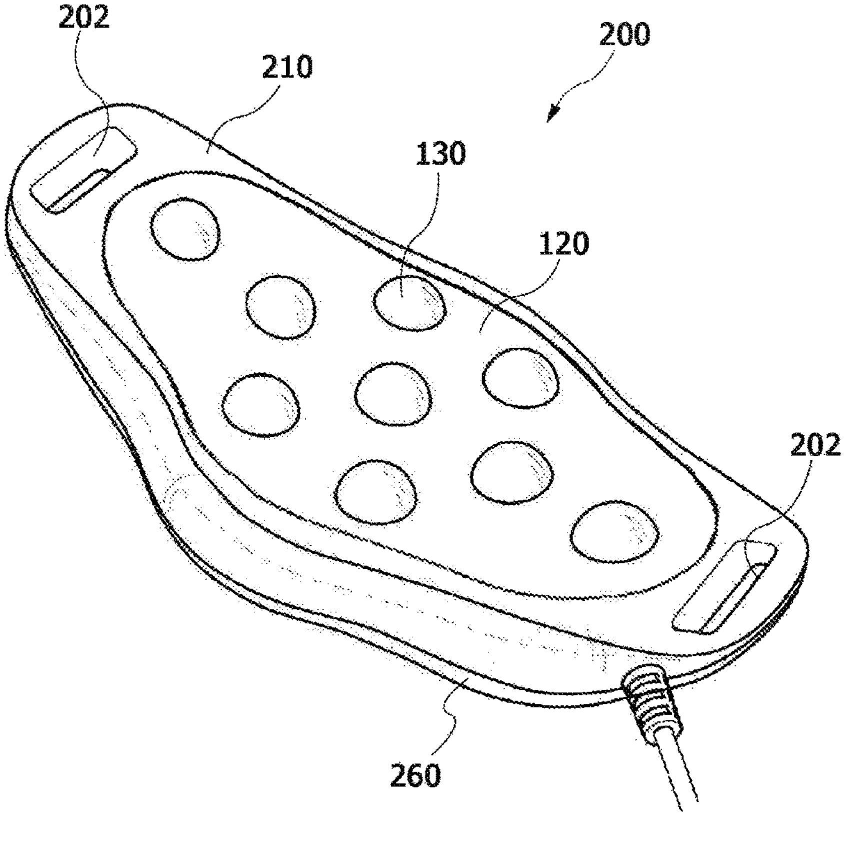
FIG. 7 is a perspective view illustrating another form of the thermo-therapeutic apparatus according to the embodiment of the present disclosure.

As shown in FIG. 7, in a thermo-therapeutic apparatus 200, both sides of each of a front cover 210 and a rear cover 260 may include holes 202 to be held by the user.

Accordingly, massage may be performed in a state in which the thermo-therapeutic apparatus 200 is held by both hands of the user through the holes 202 and then disposed on a desired portion of the abdomen. Accordingly, the user may easily hold the thermo-therapeutic apparatus 200.

Figure 8:
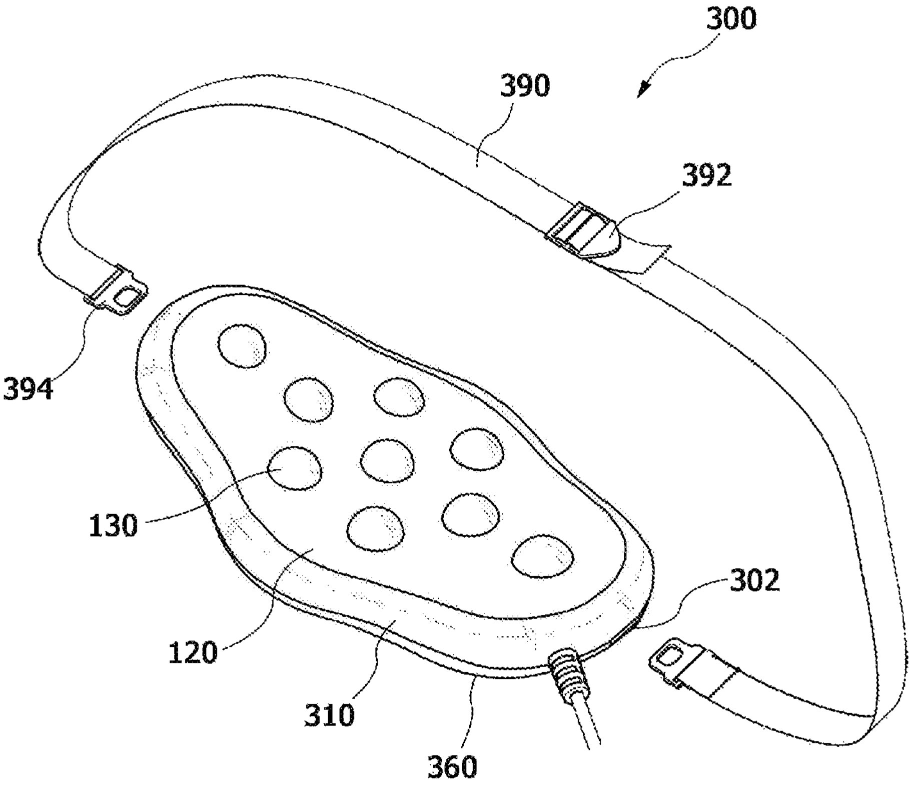
FIG. 8 is a perspective view illustrating still another form of the thermo-therapeutic apparatus according to the embodiment of the present disclosure.

As shown in FIG. 8, a thermo-therapeutic apparatus 300 may further include a wearing belt 390 to be worn on a waist of the user. Here, the wearing belt 390 may include an adjusting part 392 configured to adjust a length of a belt, and an insertion part 394 inserted into and fixed to the fixing groove 302.

To this end, the thermo-therapeutic apparatus 300 may include fixing grooves 302, into which the wearing belt 390 is detachably inserted, in both sides of each of a front cover 310 and a rear cover 360.

Meanwhile, to further improve user convenience, the holes 202 for holding as shown in FIG. 7, and the wearing belt 390 as shown in FIG. 8 may be provided together.

As described above, each of the thermo-therapeutic apparatuses 100, 200, and 300 according to the embodiments of the present disclosure can reduce time and costs for manufacturing by simplifying a coupling structure, and improve manufacturing efficiency by simplifying a manufacturing process.

Further, since the thermo-therapeutic apparatuses 100, 200, and 300 according to the embodiments of the present disclosure can efficiently transfer heat from a heater to ceramics, thermal efficiency of the ceramics for a thermal function can be improved.

In addition, since the thermo-therapeutic apparatuses 100, 200, and 300 according to the embodiments of the present disclosure can improve a massage effect by efficiently applying acupressure and heat to an acupuncture point, thus the activation of the intestinal movement can be improved.

In addition, in the thermo-therapeutic apparatuses 100, 200, and 300 according to the embodiments of the present disclosure, noises between the ceramics and skin foam due to driving of a motor for massage can be prevented, and skin foam can absorb vibration to reduce overall noises from a massage apparatus.

In addition, a user can feel softness at an area which comes into contact with the thermo-therapeutic apparatuses 100, 200, and 300 according to the embodiments of the present disclosure, and the thermo-therapeutic apparatuses 100, 200, and 300 can improve satisfaction of the user by providing a high quality appearance which looks like leather.

In a thermo-therapeutic apparatus according to one embodiment of the present disclosure, since skin foam is used to insertion-fix ceramics, time and costs for manufacturing can be reduced by simplifying a coupling structure, and manufacturing efficiency can be improved by simplifying a manufacturing process.

Further, in the present disclosure, by disposing the ceramics to directly be in contact with the heater, heat can be efficiently transferred from the heater to the ceramics, and thus thermal efficiency of the ceramics for a thermal function can be improved.

In addition, in the present disclosure, since the ceramics are disposed on an acupuncture point of an abdomen and formed to a predetermined height, a massage effect can be improved by efficiently applying acupressure and heat to the acupuncture point, and thus activation of intestinal movement can be improved.

In addition, in the present disclosure, since the ceramics are insertion-fixed to skin foam, noises between the ceramics and skin foam due to driving of a motor for massage can be prevented, and skin foam can absorb vibration to reduce overall noises from a massage apparatus.

In addition, in the present disclosure, since a part configured to come into contact with the abdomen of a human body is manufactured of skin foam, a user can feel softness at an area which comes into contact with the part manufactured of skin foam, and since the high quality appearance which looks like leather is provided, satisfaction of the user can be improved.

Although one embodiment of the present disclosure is described above, the spirit of the present disclosure is not limited to the embodiment shown in the description, and although those skilled in the art may provide other embodiments due to addition, change, or removal of the components within the scope of the same spirit of the present disclosure, the above embodiments are also included in the scope of the spirit of the present disclosure.

What is claimed is:

1. A thermo-therapeutic apparatus comprising:

a front cover having an exposed part on a center of the front cover;

a first supporting plate having a plurality of through holes formed therein and formed of skin foam having elasticity and disposed under the front cover and exposed by the exposed part;

a plurality of ceramics disposed under the first supporting plate and each insertion-fixed to the plurality of through holes with pressing against the plurality of through holes, and each configured to protrude to the outside of the first supporting plate to a predetermined height;

a heater disposed in contact with under surfaces of the plurality of ceramics and configured to heat the plurality of ceramics;

a heater supporting member configured to support the heater;

a plurality of vibrators disposed on a lower surface of a second supporting plate and disposed perpendicular to each other; and a rear cover disposed under the plurality of vibrators and coupled to the front cover, wherein the plurality of ceramics includes a downwardly open hollow for quick transferring the heat from the heater and the plurality of ceramics each include a dome-shaped portion, a protruding portion positioned below the dome-shaped portion, and a lower portion positioned between the dome-shaped portion and the protruding portion, wherein the protruding portion laterally extends along an outer circumferential side of the ceramic such that its outer diameter is larger than a largest diameter of the dome-shaped portion, wherein the first supporting plate includes a plurality of groove portions, wherein the protruding portion of each ceramic is inserted into one of the plurality of groove portions;

wherein the heater is formed in a plate shape or a linear shape, and includes one among a hot wire, an aluminum heater, a non-woven carbon fabric, a cotton mesh heater, and a carbon fiber heater; and wherein the first supporting plate comprises hook grooves on a step portion;

wherein the heater simultaneously supports the lower surface of the protruding portion and the lower surface of the first supporting plate;

wherein the heater is disposed between the first support plate and the heater support member and the heater is configured to contact the lower surface of the protruding portion;

wherein the upper surface of the second supporting plate supports the lower surface of the heater supporting member;

wherein the heater supporting member is disposed between the heater and the second supporting plate; and wherein the second supporting plate divides the area where the heater is placed and the area where the vibrator is placed.

2. The thermo-therapeutic apparatus of claim 1, wherein the heater is formed in a plate shape.

3. The thermo-therapeutic apparatus of claim 1, wherein the through hole is configured to be disposed at a location corresponding to an acupuncture point of an abdomen.

4. The thermo-therapeutic apparatus of claim 3, wherein the heater is formed in a plate shape.

5. The thermo-therapeutic apparatus of claim 4, wherein the heater includes a hot wire.

6. The thermo-therapeutic apparatus of claim 4, wherein the heater includes an aluminum heater.

7. The thermo-therapeutic apparatus of claim 4, wherein the heater includes a non-woven carbon fabric.

8. The thermo-therapeutic apparatus of claim 4, wherein the heater includes cotton mesh heater.

9. The thermo-therapeutic apparatus of claim 4, wherein the heater includes a carbon fiber heater.

10. The thermo-therapeutic apparatus of claim 4, further comprising a wearing belt to be worn on a waist of the user, wherein the front cover and the rear cover include fixing grooves so that the wearing belt is detachably inserted into both sides thereof.

11. The thermo-therapeutic apparatus of claim 1, wherein each of the front cover and the rear cover includes holes in both sides thereof to be held by a user.

12. The thermo-therapeutic apparatus of claim 1, further comprising a wearing belt to be worn on a waist of the user, wherein the front cover and the rear cover include fixing grooves so that the wearing belt is detachably inserted into both sides thereof.

13. The thermo-therapeutic apparatus of claim 1, wherein the heater is formed in a linear shape.

14. The thermo-therapeutic apparatus of claim 13, wherein the heater includes a hot wire.

15. The thermo-therapeutic apparatus of claim 13, wherein the heater includes an aluminum heater.

16. The thermo-therapeutic apparatus of claim 13, wherein the heater includes a non-woven carbon fabric.

17. The thermo-therapeutic apparatus of claim 13, wherein the heater includes a cotton mesh heater.

18. The thermo-therapeutic apparatus of claim 13, wherein the heater includes a carbon fiber heater.

19. The thermo-therapeutic apparatus of claim 13, further comprising a wearing belt to be worn on a waist of the user, wherein the front cover and the rear cover include fixing grooves so that the wearing belt is detachably inserted into both sides thereof.

* * * * *